United States Patent
Miranda (10) Patent No.: US 8,171,539 B2
(45) Date of Patent: May 1, 2012

(54) METHODS AND APPARATUS FOR IMPLEMENTING A SEARCH TREE

(75) Inventor: Trevor Miranda, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 698 days.

(21) Appl. No.: 12/349,924

(22) Filed: Jan. 7, 2009

(65) Prior Publication Data

US 2010/0175124 A1    Jul. 8, 2010

(51) Int. Cl.
*H04L 29/06* (2006.01)
(52) U.S. Cl. .......................................... 726/13; 713/153
(58) Field of Classification Search ...................... 726/13
See application file for complete search history.

(56) References Cited

U.S. PATENT DOCUMENTS

| | | | |
|---|---|---|---|
| 6,587,466 B1 * | 7/2003 | Bhattacharya et al. | .. 370/395.21 |
| 6,970,462 B1 | 11/2005 | McRae | |
| 7,154,888 B1 | 12/2006 | Li et al. | |
| 7,236,492 B2 | 6/2007 | Davis et al. | |
| 7,236,493 B1 | 6/2007 | McRae | |
| 7,317,723 B1 | 1/2008 | Guru | |
| 7,325,074 B2 | 1/2008 | McRae | |
| 7,796,541 B1 * | 9/2010 | Goel et al. | ..................... 370/256 |
| 2002/0023089 A1 * | 2/2002 | Woo | .............................. 707/101 |
| 2004/0044758 A1 * | 3/2004 | Palmer et al. | ................. 709/223 |
| 2004/0254909 A1 * | 12/2004 | Testa | ................................ 707/1 |
| 2005/0050060 A1 * | 3/2005 | Damm et al. | ................. 707/100 |

OTHER PUBLICATIONS

Kenel et al., "Traffic-Adaptive Packet Filtering of Denial of Service Attacks", 2006, Proceedings of the 2006 International Symposium on a World of Wireless, Mobile and Multimedia Networks, pp. 1-5.*
Gupta, P., et al., Classifying Packets with Hierarchical Intelligent Cuttings, IEEE Micro, vol. 20 , Issue 1, pp. 34-41, 2000.

* cited by examiner

Primary Examiner — Matthew Smithers (57) ABSTRACT

Apparatus and methods are provided for implementing a firewall in a network infrastructure component. A method comprises generating a search tree for a plurality of rules. The search tree comprises a first node having a first field bounds and a first set of rules of the plurality of rules, and a plurality of child nodes for the first node. Each child node has child field bounds based on an intersection of the first field bounds and the first set of rules, and each child node is assigned a respective subset of the first set of rules based on the respective child field bounds. The method further comprises receiving a first packet, identifying a first child node of the plurality of child nodes based on values for one or more fields of the first packet, and applying the respective subset of rules assigned to the first child node to the first packet.

18 Claims, 5 Drawing Sheets

| RULE | FIELD 1 | FIELD 2 | FIELD 3 | FIELD 4 | FIELD 5 |
|---|---|---|---|---|---|
| R1 | 100-200 | 300-310 | 30 | 1000-1001 | 2000-2001 |
| R2 | 201-300 | 300-310 | 31 | 1000-1001 | 2000-2001 |
| R3 | 301-400 | 300-310 | 32 | 1000-1001 | 2000-2001 |
| R4 | 601-650 | 300-310 | 33 | 1000-1001 | 2000-2001 |
| R5 | 601-800 | 300-310 | 34-35 | 1000-1001 | 2000-2001 |
| R6 | 701-800 | 300-310 | 34-35 | 1000-1001 | 2000-2001 |
| R7 | 801-850 | 300-310 | 36 | 1000-1001 | 2000-2001 |
| R8 | 801-900 | 300-310 | 37 | 1000-1001 | 2000-2001 |
| R9 | 901-1000 | 300-310 | 38 | 1000-1001 | 2000-2001 |

$100 \leq$ FIELD $1 \leq 550$ $551 \leq$ FIELD $1 \leq 1000$

504: R1, R2, R3

506: R4, R5, R6, R7, R8, R9

$601 \leq$ FIELD $1 \leq 800$ $801 \leq$ FIELD $1 \leq 1000$

METHODS AND APPARATUS FOR IMPLEMENTING A SEARCH TREE

TECHNICAL FIELD

Embodiments of the subject matter described herein relate generally to network infrastructures, and more particularly, embodiments of the subject matter relate to methods and apparatus utilizing a search tree to classify packets when performing rule lookup in a firewall.

BACKGROUND

Computer networks rely on infrastructure components that establish data communication links with other devices. Many computer networks include a firewall configured to monitor and control the flow of data within the network. Often, the firewall is implemented by an infrastructure component, such as a router or switch. The firewall inspects network traffic passing through the infrastructure component, and controls the flow of traffic based on a set of rules, also known as an access control list (ACL). The rules specify how a packet should be handled based on the value(s) of one or more fields or attributes associated with the packet, such as, for example, the source IP address, source port, destination IP address, destination port, and the like. A network administrator may configure the firewall by defining the rules and the infrastructure component then handles packets by comparing the fields or attributes of the packet to the set of rules. For example, a router or switch may receive a packet, and permit or deny further transmission of the packet by comparing the source IP address associated with the packet to one or more rules.

Generally, the process of looking up and applying rules is one of the most frequently performed operations in a firewall. As a result, the overall performance of the firewall, and thus the performance of the underlying infrastructure component (e.g., a router or switch) implementing the firewall, depends on the speed and efficiency of the rule lookup. There may be as many as a few hundred or more different rules defined in the set of rules (or ACL). As a result, it is impractical or inefficient to implement the set of rules using a linear list, for example, because of the amount of time that may be required to traverse and compare each rule to a received packet (e.g., worst case time of O(n)). Additionally, because the rules of the set of rules may span various combinations and/or ranges of multiple fields of the packet (e.g., source IP address, destination IP address, source port, destination port), other conventional data structures such as binary trees are also inadequate.

In order to improve the rule lookup process, some current systems implement the set of rules using a tree data structure. However, because of the number of fields and the range of values that the rules span, along with the number of rules in the set of rules, it is difficult to arrive at an optimal tree without iteratively constructing a number of different trees and analyzing the performance of each one. Thus, prior art systems use one or more heuristics to create a tree by dividing or splitting the set of rules among one or more fields and assigning subsets of the set of rules to child nodes. However, prior art methods are inefficient and result in search trees with increased memory or storage requirements.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of network architectures, data transmission protocols, and network configurations, and that the system described herein is merely one suitable example.

For the sake of brevity, conventional techniques related to computer networking, data transmission, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

Technologies and/or concepts described herein related to methods and apparatus for generating a search tree for classifying received packets for performing rule lookup in a network infrastructure component, such as a router or a wireless switch. A search tree is generated by determining to divide a parent node into a plurality of child nodes based in part on the intersection of the set of rules and the field bounds assigned to the parent node. Because the intersection of the set of rules and the field bounds will be less than or equal to the field bounds, the parent node will be split or divide along a smaller range of values, resulting in fewer child nodes and less duplication of rules across child nodes. As a result, the search tree has reduced storage requirements and may also perform rule lookup more efficiently than conventional search trees.

Figure 1:
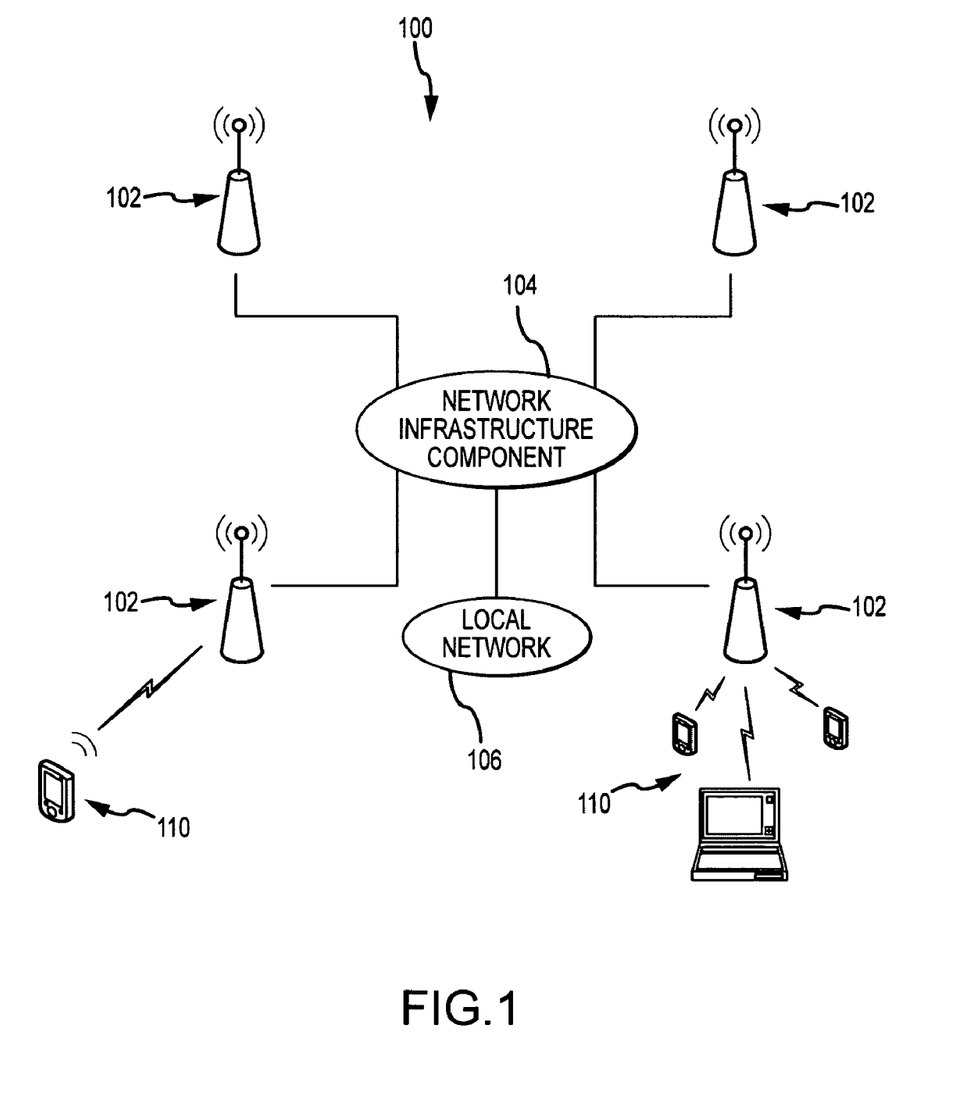
FIG. 1 is a schematic representation of an exemplary computer network in accordance with one embodiment.

FIG. 1 depicts an exemplary embodiment of a computer network 100. The computer network 100 includes, without limitation, a plurality of computing devices 102, a network infrastructure component 104, and local network 106, which in turn may be coupled to and/or include one or more additional components and/or computer networks, as will be understood. It should be understood that FIG. 1 is a simplified representation of a computer network 100 for purposes of explanation and ease of description. A practical embodiment may have any number of network infrastructure components 104, each supporting any number of computing devices 102.

It will be appreciated in the art that the topology and configuration of the computing network 100 can vary to suit the needs of the particular application, and FIG. 1 is not intended to limit the application or scope of the subject matter in any way. In an exemplary embodiment, the computer network 100 is realized as a wireless network configured to support communications between and/or among wireless client devices 110, as described in greater detail below. In this regard, although the subject matter may be described herein in the context of a wireless network implementation, the subject matter is not limited to any particular computer network 100.

In an exemplary embodiment, the computer network 100 is configured as a wireless local area network (WLAN). In alternative embodiments, the computer network 100 may be configured as a wireless personal area network (WPAN), a wireless wide area network (WWAN), local area network (LAN), or any other suitable network configuration. The computer network 100 may be configured to utilize a data communication protocol in accordance with IEEE 802.11, conventional Internet Protocol techniques, TCP/IP, hypertext transfer protocol (HTTP), SOAP, or another comparable protocol.

In the illustrated embodiment, the computing devices 102 are realized as wireless access devices coupled to the network infrastructure component 104. In accordance with one embodiment, the wireless access devices may be realized as access ports, which rely on the network intelligence and management functions provided by the network infrastructure component 104, as described in greater detail below. In this regard, the access ports are "thin" or "lightweight" access devices. In an alternate embodiment, the wireless access devices may be realized as access points, which include network intelligence and management functions incorporated therein but are configured to utilize network infrastructure component 104.

In a preferred embodiment, the computing devices 102 are physically connected to the network infrastructure component 104 (e.g., via an Ethernet cable). In alternative embodiments, the computing devices 102 may be coupled to the network infrastructure component 104 wirelessly, or via one or more additional intervening devices, such as, for example, wireless switches, access devices, Ethernet switches, routers, and/or various combinations thereof. In this regard, the computing devices 102 are at least logically connected to the network infrastructure component 104, but need not be physically connected to the network infrastructure component 104. In an exemplary embodiment, the computing devices 102 are configured to receive data from wireless client devices 110 over wireless data communication links. Once that data is captured by the computing device 102, the data may be encapsulated, for example, into a packet format compliant with a suitable data communication protocol, for transmission or communication to another computing device 102, a wireless client device 110, and/or the local network 106 in a conventional manner.

A wireless client device 110 may be realized using any suitable platform, including, without limitation: a cellular telephone; a personal digital assistant; a digital media player; a portable video game device; a laptop or other portable computer; or the like. It should be appreciated that the functionality of the wireless client device 110 will largely be dependent on the user, manufacturer, or vendor responsible for configuring and/or designing the wireless client device 110, and the subject matter described herein is not limited to use with a specific wireless client device 110.

In an exemplary embodiment, the network infrastructure component 104 is realized as a wireless switch that provides network intelligence and management functions in order to support operation of the computer network 100. In alternative embodiments, the network infrastructure component 104 may be realized as an Ethernet switch, a router, a server computer, a firewall appliance, a gateway, and the like. In an exemplary embodiment, the network infrastructure component 104 receives encapsulated data and/or packets from a computing device 102 and/or local network 106 for communication to another computing device 102, a wireless client device 110, and/or the local network 106 in a conventional manner. The network infrastructure component 104 is configured to implement a firewall and/or access control list (ACL) for controlling the flow of data and/or network traffic that passes through the network infrastructure component 104. In this regard, the network infrastructure component 104 analyzes one or more fields of the received data and/or packet and determines how to handle the data and/or packet (e.g., permit or deny transmission to the destination) by comparing fields of the data and/or packet to a set of rules defined by the firewall and/or access control list, as described in greater detail below.

Figure 2:
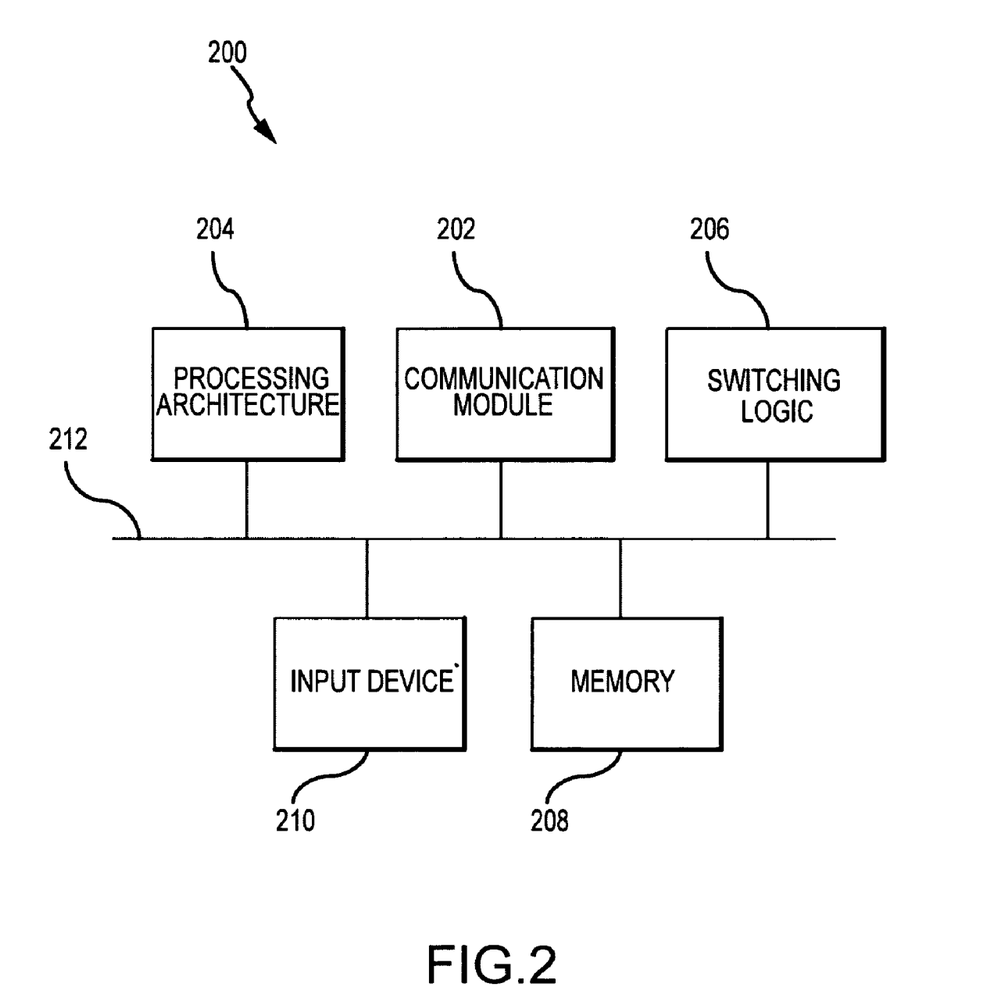
FIG. 2 is a schematic representation of an exemplary network infrastructure component suitable for use in the computer network shown in FIG. 1 in accordance with one embodiment.

FIG. 2 is a schematic representation of an embodiment of a network infrastructure component 200 suitable for use in a network, such as computer network 100 shown in FIG. 1. In an exemplary embodiment, a network infrastructure component 200 includes, without limitation: a communication module 202, a processing architecture 204, switching logic 206, and a suitable amount of memory 208. In accordance with one embodiment, the network infrastructure component 200 also includes an input device 210. The elements of network infrastructure component 200 may be interconnected together using a bus 212 or another suitable interconnection arrangement that facilitates communication between the various elements of network infrastructure component 200. It should be appreciated that FIG. 2 depicts the network infrastructure component 200 in an oversimplified manner, and a practical embodiment may include additional components and suitably configured processing logic to support known or conventional operating features that are not described in detail herein.

In an exemplary embodiment, the network infrastructure component 200 is realized as a wireless switch that contains intelligence and processing logic that facilitates centralized control and management of WLAN elements, including computing devices (e.g., wireless access devices) in operable communication with network infrastructure component 200. In this regard, the network infrastructure component 200 may serve as a point of interconnection between a WLAN and a fixed wire (e.g., Ethernet) network. Network infrastructure component 200 is suitably configured to receive data and/or packets from computing devices for transmission to other computing devices in a conventional manner. As described in greater detail below, the network infrastructure component 200 implements a firewall and/or access control list for determining how to handle the received data and/or packets that rely on the routing functionality of the network infrastructure component 200. The network infrastructure component 200 analyzes one or more fields of the received data and/or packet by comparing fields of the data and/or packet to the rules defined by the firewall and/or access control list and determines how to handle the data and/or packet (e.g., permit or deny subsequent transmission). In this regard, the network infrastructure component 200 may include an input device 210, which may be utilized to allow a user to input, enter, or otherwise define the rules for the firewall or access control list being implemented by the network infrastructure component 200, as will be understood. The input device 210 may be realized as a keypad, a touchpad, a keyboard, a mouse, a touchscreen, or another suitable input device capable of receiving input from a user.

In an exemplary embodiment, communication module 202 generally represents the hardware, software, firmware, processing logic, and/or other components of network infrastructure component 200 that enable bi-directional communication between network infrastructure component 200 and network components and/or computing devices to which network infrastructure component 200 is coupled. For example, referring to FIG. 1, communication module 202 is suitably configured to communicate with components on the computer network 100, such as the computing devices 102 and/or the local network 106. The communication module 202 includes a number of physical interfaces or ports for connecting to computing devices to the network infrastructure component 200. In accordance with one embodiment, communication module 202 also provides an Ethernet interface such that network infrastructure component 200 can communicate with a conventional Ethernet-based computer network. In this regard, communication module 202 may include a physical interface for connection to the computer network, and communication module 202 (and/or processing architecture 204) may handle Ethernet addressing for data packets sent from network infrastructure component 200. In an exemplary embodiment, the communication module 202 is configured to receive encapsulated data and/or packets from computing devices coupled to the network infrastructure component 200, as described in greater detail below.

In an exemplary embodiment, the processing architecture 204 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, the processing architecture 204 may be realized as a microprocessor, a controller, a microcontroller, a state machine, or the like. A processing architecture 204 may also be implemented as a combination of computing devices, e.g., a combination of a digital signal processor and a microprocessor, a plurality of microprocessors, one or more microprocessors in conjunction with a digital signal processor core, or any other such configuration. In practice, processing architecture 204 includes processing logic that may be configured to carry out the functions, techniques, and processing tasks associated with the operation of the network infrastructure component 200, as described in greater detail below. Furthermore, the steps of a method or algorithm described in connection with the embodiments disclosed herein may be embodied directly in hardware, in firmware, in a software module executed by the processing architecture 204, or in any practical combination thereof.

In an exemplary embodiment, switching logic 206, which may be partially or completely realized in the processing architecture 204, represents processing logic and functionality associated with the data switching and communicating features of network infrastructure component 200. Switching logic 206 may be configured to perform conventional operations that enable data traffic in the wireless network to be communicated between wireless client devices, access devices, network infrastructure components, and network-based systems or applications. In an exemplary embodiment, switching logic 206 and processing architecture 204 may be cooperatively configured to implement processing logic and functionality associated with the handling of encapsulated data and/or packets, as described in greater detail below.

In an exemplary embodiment, memory 208 includes sufficient data storage capacity to support the operation of the processing architecture 204 and/or network infrastructure component 200. Memory 208 may be realized as RAM memory, ROM memory, EEPROM memory, flash memory, registers, a hard disk, a removable disk, or any other form of storage medium or memory technology known in the art. In this regard, memory 208 is coupled to processing architecture 204 such that processing architecture 204 can access information stored in memory 208, that is, the processing architecture 20 may read information from and/or write information to memory 208. In some embodiments, memory 208 may be integral to processing architecture 204. In accordance with one embodiment, one or more software modules may reside in memory 208. In an exemplary embodiment, memory 208 is utilized to store information for implementing a search tree data structure associated with a firewall implemented on the network infrastructure component 200, as described in greater detail below.

Figure 3:
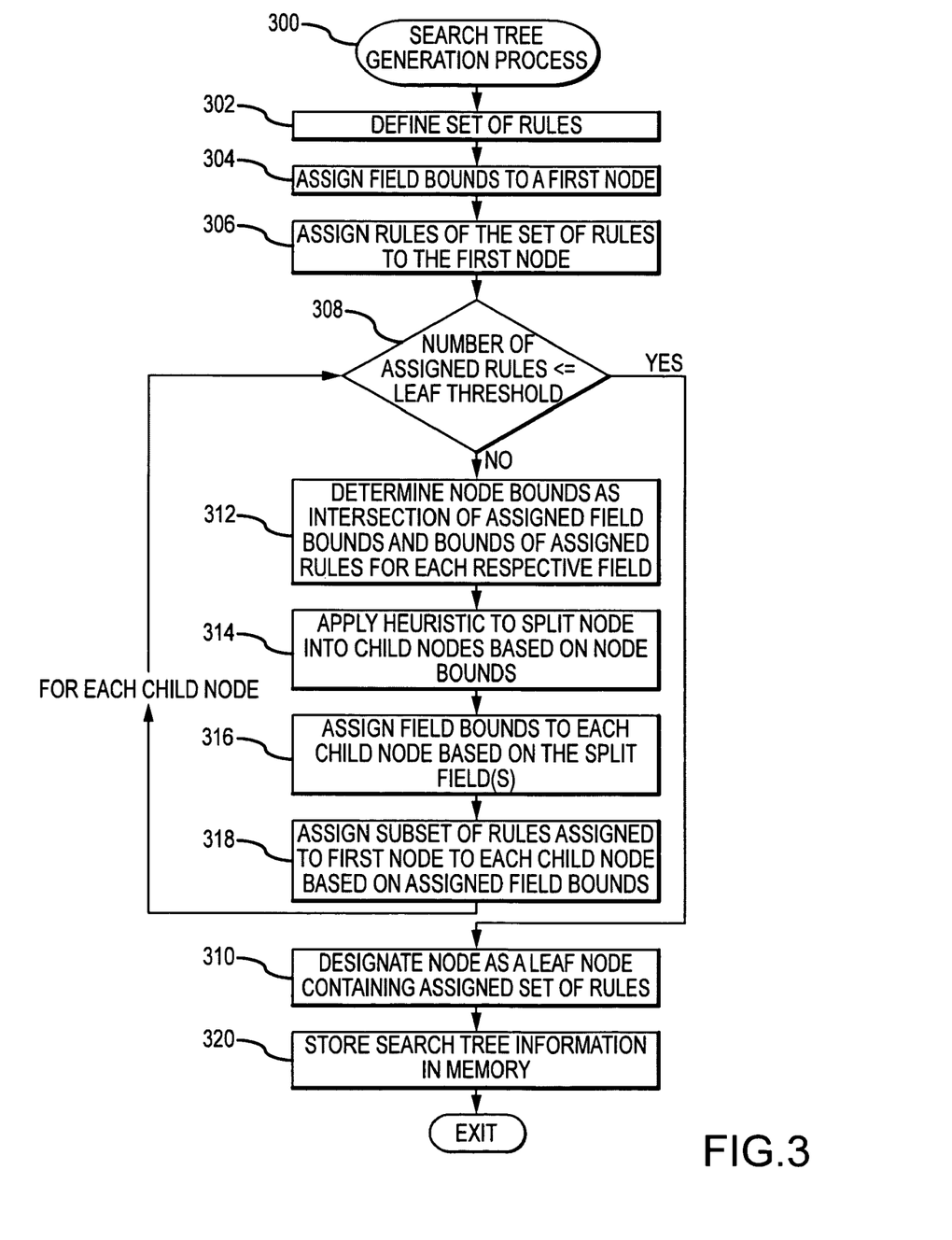
FIG. 3 is a flow diagram of a search tree generation process in accordance with one embodiment.

Referring now to FIG. 3, in an exemplary embodiment, a computer network may be configured to perform a search tree generation process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the network infrastructure component 104, 200, computing devices 102, the processing architecture 204, the switching logic 206, and/or the memory 208. It should be appreciated any number of additional or alternative tasks may be included, and may be incorporated into a more comprehensive procedure or process having additional functionality not described in detail herein.

Referring now to FIG. 3, and with continued reference to FIG. 1 and FIG. 2, the search tree generation process 300 may be performed to implement a firewall and/or access control list in a network infrastructure component or another computing device. The search tree generation process 300 initializes when a computer network or a device (e.g., a network infrastructure component or another computing device) begins operation, for example, upon initialization of the computer network or upon resuming operation after regularly scheduled maintenance or downtime.

In an exemplary embodiment, the search tree generation process 300 begins by defining a set of rules (the ruleset) to be used for implementing the firewall and/or access control list (task 302). Depending on the embodiment, the set of rules may be stored and/or predefined (e.g., in memory 208), or the set of rules may be manually and/or dynamically defined. For example, a user (e.g., a network administrator) may enter and/or define the set of rules (e.g., via input device 210) or otherwise upload a set of rules to the network infrastructure component (e.g., via communication module 202), as will be appreciated in the art. The set of rules comprises a plurality of rules that define how a received packet (or another encapsulated or formatted data unit) should be handled by the network infrastructure component based on the values for one or more fields of the received packet. In this regard, a rule comprises a list or range of values across one or more different fields. A field may comprise a formatted segment of the received packet comprising information related to transmitting and/or communicating the packet, such as, source address (e.g., source IP address), destination address (e.g., destination IP address), source port, destination port, protocol, packet priority, and other suitable fields known in the art. In some embodiments, a field may comprise one or more properties associated with the received packet, such as, for example, the time the packet was received, or the network interface where the packet was received. As such, depending on the embodiment, the field may or may not be read from the packet. For each field, the rule may specify a single value or a range of values, which identify the received packets to which the rules apply, as will be appreciated in the art. In an exemplary embodiment, each rule of a set of rules has a unique priority associated with it. The search tree may be used to lookup or identify the highest priority rule that applies to or otherwise matches the values for the fields of a received packet.

In an exemplary embodiment, the set of rules identifies, specifies, or otherwise determines how received packets are handled. In accordance with one embodiment, the set of rules may be used to identify which packets are permitted or denied. For example, in a default deny implementation where the default condition (e.g., when the fields of a received packet do not match any rule of the set) of the firewall is to deny a received packet, the rules may define packets which should be permitted or allowed. That is, a received packet whose fields match one of the rules of the set will be transmitted and/or routed to its destination address. Conversely, in a default allow implementation where the default condition of the firewall is to allow a received packet, the rules may define packets which should be denied. That is, a received packet whose fields match one of the rules of the set will not be transmitted and/or routed to its destination, or in other words, the packet will be dropped. In alternative embodiments, the set of rules may identify or specify other actions for handling received packets. For example, a received packet matching a rule may be modified (e.g., a rule to modify a certain field(s) of the packet), logged (e.g., a rule to generate a message indicating the packet was received), copied (e.g., a rule specifying transmitting a copy of the packet to another interface), or prioritized for another protocol or communications layer (e.g., another OSI layer). It should be appreciated in the art that the subject matter described herein is not limited to any particular action or manner of handling received packets.

Figure 4:
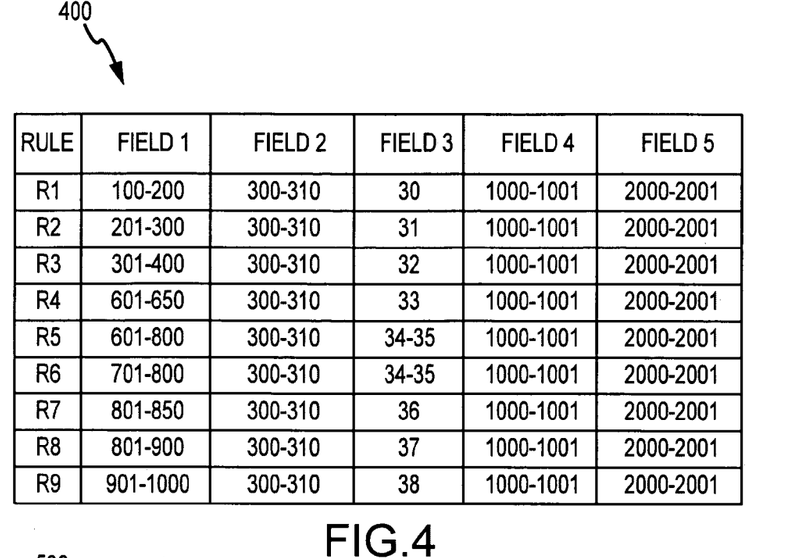
FIG. 4 is table of an exemplary ruleset suitable for use with the search tree generation process of FIG. 3 in accordance with one embodiment.

FIG. 4 depicts an exemplary ruleset 400 suitable for use with the search tree generation process 300 of FIG. 3. For example, FIG. 4 depicts a ruleset 400 comprising nine rules (R1 through R9), each rule spanning five different fields (Field 1 through Field 5). It should be understood FIG. 4 is a simplified representation of a ruleset 400 for purposes of explanation and ease of description, and in practice, a ruleset may include additional rules and span additional fields, as will be appreciated in the art. If the values for the respective fields of a received packet match or are within the range of fields defined by a rule (e.g., the fields of the received packet are within the range of values defined by a row of the table), then that rule of the ruleset 400 applies to the received packet, as will be appreciated in the art and described in greater detail below.

Referring again to FIG. 3, in an exemplary embodiment, the search tree generation process 300 continues by creating a first node by assigning field bounds to the first node and assigning one or more rules of the set of rules (or ruleset) to the first node (tasks 304, 306). In this regard, the first node may be understood as the root node of the search tree. As used herein, field bounds should be understood as referring to a value or range of values for each respective field defined by the set of rules (or ruleset). The field bounds are used identify whether a received packet corresponds to a particular node, that is, if the values for the fields of the received packet are within the field bounds for a node, the node is identified as the appropriate node that corresponds to the values for the fields of the received packet. In an exemplary embodiment, the root node is assigned field bounds equal to the entire range of values for all fields covered by the set of rules (or ruleset). In other words, the field bounds for the root node define a hyperrectangle that encompasses all rules of the set of rules. For example, referring to FIG. 4 and FIG. 5, in an exemplary embodiment, the root node 502 of a search tree 500 would be assigned field bounds of (100-1000, 300-310, 30-38, 1000-1001, 2000-2001) based on the ruleset 400. In an alternative embodiment, the field bounds assigned to the root node may comprise the range of possible values for all fields covered by the set of rules (e.g., all possible values for Field 1 through Field 5 of a received packet). As described in greater detail below, the root node is preferably assigned field bounds such that entire set of rules is assigned to the root node.

In an exemplary embodiment, the first set of rules is assigned to the first node based on the field bounds of the first node. In this regard, rule of the set of rules (or ruleset) is assigned to a node if at least a portion of the range values for the fields defined by the rule is within the range values for the field bounds. In other words, the hyperrectangle defined by the range of values for the fields of the rule intersects or overlaps at least part of the hyperrectangle defined by the field bounds. For the root node, the assigned set of rules is equal to the entire set of rules. In an exemplary embodiment, if the firewall comprises a plurality of access control lists, the root node is assigned the entire set of rules for one access control list, wherein each access control list of the plurality of access control lists may have an associated search tree, as will be appreciated in the art. As described in greater detail below, the assigned set of rules for a child node comprises a subset of the set of rules assigned to the parent node. For example, referring to FIG. 4 and FIG. 5, in an exemplary embodiment, a root node 502 for a search tree 500 for the ruleset 400 preferably has field bounds such that all rules of the ruleset 400 are assigned to the root node 502. For example, if the field bounds for the root node 502 are (100-1000, 300-310, 30-38, 1000-1001, 2000-2001), then the hyperrectangle defined by the field bounds overlaps the hyperrectangle defined by each respective rule of the ruleset 400. For example, the hyperrectangle defined by rule R1 (100-200, 300-310, 30, 1000-1001, 2000-2001) intersects the hyperrectangle defined by the field bounds (100-1000, 300-310, 30-38, 1000-1001, 2000-2001). In an exemplary embodiment, the search tree generation process 300 stores the first node and information relating to the assigned field bounds and assigned set of rules in a first region of a range of memory addresses in memory (e.g., memory 208).

Referring again to FIG. 3, with continued reference to FIG. 1, FIG. 2, FIG. 4 and FIG. 5, the search tree generation process 300 continues by determining if the number of rules assigned to the first node is less than or equal to a leaf threshold (task 308). The leaf threshold defines the total number of rules that will be allocated and/or assigned to a leaf node of the search tree, wherein any node assigned a number of rules greater than the leaf threshold will be split or divided into child nodes, as described in greater detail below. In this regard, the leaf threshold represents a tradeoff between the total memory or storage requirements for the search tree and the overall speed and/or efficiency of the search tree during rule lookup. For example, a lower leaf threshold will increase the depth or height of the tree, which increases memory requirements, but reduce the number of rules assigned to a leaf node, which reduces the amount of time and/or processing for applying the rules of the leaf node to a received packet. Conversely, a higher leaf threshold decreases the depth or height of the tree, but increases the number of rules assigned to a leaf node, which in turn increases the amount of time and/or processing for applying the rules of the leaf node to a received packet. If the number of rules assigned to a node are less than or equal to a leaf threshold, the search tree generation process 300 designates the node as a leaf node, as described in greater detail below (task 310).

If the number of rules assigned to the first node is greater than the leaf threshold, the search tree generation process 300 continues by determining node bounds for the first node as the intersection of the assigned field bounds for the first node and the assigned set of rules for the first node (task 312). In this regard, the search tree generation process 300 determines the intersection of the assigned set of rules and the assigned field bounds by identifying the intersection of the hyperrectangle defined by the assigned set of rules and the hyperrectangle defined by the assigned field bounds. For example, in FIG. 5, the search tree 500 is generated using a leaf threshold value of three. Because the number of rules assigned to the root node 502 is greater than three, the search tree generation process 300 determines the intersection of the field bounds and the set of rules assigned to the root node 502. If the field bounds are chosen such that all rules of the ruleset 400 are assigned to the root node 502, then the intersection of the ruleset 400 and the field bounds will be (100-1000, 300-310, 30-38, 1000-1001, 2000-2001), which corresponds to the span of the ruleset 400.

In an exemplary embodiment, the search tree generation process 300 continues by dividing the first node into a plurality of child nodes based on the node bounds. In this regard, the search tree generation process 300 divides the first node by applying one or more heuristics to the first node using the node bounds to obtain one or more division criteria and splitting the first node into the plurality of child nodes based on the division criteria (task 314). Various heuristics for obtaining division criteria for dividing or splitting a parent node into child nodes are known in the art, and as such, will not be described in detail herein. In general, these heuristics attempt to balance the tradeoff between storage requirements and the speed of rule lookup, for example, by achieving uniform distribution of rules across nodes and minimizing duplication of rules across nodes. In an exemplary embodiment, the set of heuristics is applied to the node bounds to determine the field(s) along which the parent node should be split, and the number of child nodes that the parent node should be split into. For example, referring to FIG. 5, the search tree generation process 300 may apply a heuristic to the node bounds for the root node 502 and obtain division criteria indicating that the root node 502 should be split into two child nodes 504, 506 along Field 1.

In an exemplary embodiment, once a division criterion is determined, the search tree generation process 300 divides or splits the first node into a plurality of child nodes by assigning field bounds to each child node based on the node bounds (task 316). For example, once the field(s) to be split along is identified, the range of values for that field of the node bounds is split into as many ranges as the identified number of child nodes to be created. Referring again to FIG. 5, if the heuristic applied to the root node 502 indicates that the root node 502 should be split into two child nodes 504, 506 along Field 1, the search tree generation process 300 divides Field 1 of the node bounds for the root node 502 into two. In other words, the hyperrectangle defined by the field bounds for node 502 is split along the plane defined by the midpoint of the node bounds along Field 1, such that the first child node 504 is assigned child field bounds of (100-550, 300-310, 30-38, 1000-1001, 2000-2001) and the second child node 506 is assigned child field bounds of (551-1000, 300-310, 30-38, 1000-1001, 2000-2001). In an exemplary embodiment, the child field bounds are the same as the parent node bounds for the remaining fields that the parent node is not split along. In this regard, the child field bounds are a subset of the parent node bounds.

In an exemplary embodiment, the search tree generation process 300 continues by assigning a second set of rules to each child node based on the child node's assigned field bounds (task 318). The search tree generation process 300 assigns a subset of the set of rules assigned to the parent node to each child node based on the assigned child field bounds, in a similar manner as described above in regards to the first node (e.g., task 306). In other words, the search tree generation process 300 assigns a rule of the set of rules assigned to the parent node to the child node if the rule intersects the child field bounds, that is, at least a portion the range of values for the fields defined by the rule is within the child field bounds. For example, referring again to FIG. 4 and FIG. 5, three rules of the ruleset 400 (R1, R2, R3) are assigned to the first child node 504 because they intersect (or comprise a subset of) the child field bounds for node 504, and six rules of the ruleset 400 (R4, R5, R6, R7, R8, R9) are assigned to the second child node 506 because they intersect the child field bounds for node 506. In an exemplary embodiment, the search tree generation process 300 stores each child node and information relating to the assigned child field bounds and assigned child set of rules in a respective region of the range of memory addresses in memory (e.g., memory 208). The search tree generation process 300 also stores an index in an index region of the range of memory addresses in memory. The index stores and/or maintains the parent/child relationship information for the nodes of the search tree, and may also maintain information regarding the field(s) and/or value(s) which parent nodes are split along.

In an exemplary embodiment, the loop defined by tasks 308, 310, 312, 314, 316, and 318 repeats for each child node created by the search tree generation process 300. If a number of rules assigned to a child node is greater than the leaf threshold, the search tree generation process 300 divides and/or splits the child node into additional child nodes (or grandchild nodes), as will be understood in the art. For example, referring again to FIG. 5, the number of rules assigned to the first child node 504 is not greater than the leaf threshold (three). The search tree generation process 300 designates the first child node 504 as a leaf node by updating and storing the information in the respective region of the range of memory addresses for child node 504 (e.g., memory 208) (tasks 308, 310, 320).

Figure 5:
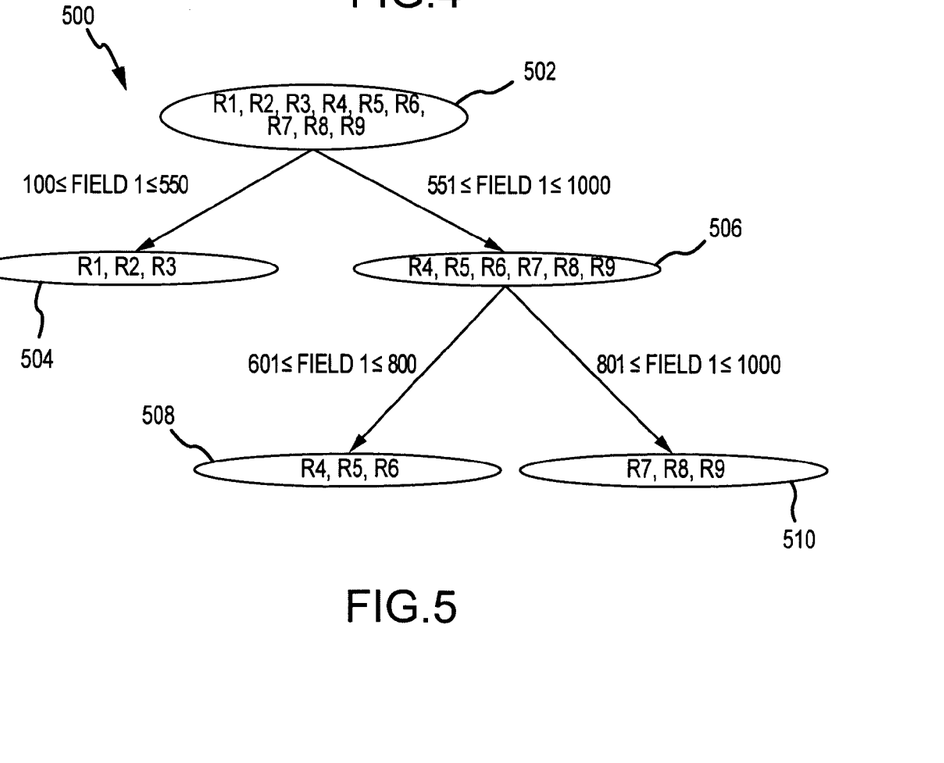
FIG. 5 is a schematic representation of an exemplary search tree suitable for use with the search tree generation process of FIG. 3 in accordance with one embodiment.

Still referring to FIG. 5, and with continued reference to FIGS. 1-4, because the number of rules assigned to the second child node 506 is greater than the leaf threshold, the search tree generation process 300 continues by determining node bounds for the second child node 506 (tasks 308, 310, 312). As described above, the search tree generation process 300 determines the node bounds for the second child node 506 by determining the intersection of the assigned child field bounds (551-1000, 300-310, 30-38, 1000-1001, 2000-2001) and the assigned set of rules (R4 through R9) (task 312). In this regard, the node bounds for the second child node 506 are (601-1000, 300-310, 33-38, 1000-1001, 2000-2001), which comprises a smaller range of values than the child field bounds. The search tree generation process 300 continues by dividing the second child node 506 into a plurality of child nodes (or grandchild nodes) based on the node bounds. For example, the search tree generation process 300 may apply one or more heuristics to the second child node 506 using the node bounds to obtain a division criterion indicating that node 506 should be split into two child nodes 508, 510 along Field 1. The search tree generation process 300 splits node 506 by determining that the parent field bounds should be split at the midpoint of the node bounds along Field 1, such that the child node 508 is assigned child field bounds of (601-800, 300-310, 33-38, 1000-1001, 2000-2001) and the second child node 510 is assigned child field bounds of (801-1000, 300-310, 33-38, 1000-1001, 2000-2001) (task 316). The search tree generation process 300 continues by assigning rules R4, R5, and R6 to child node 508 and rules R7, R8 and R9 to child node 510, as described above (task 318). The search tree generation process 300 updates the index to indicate the parent/child relationship information for the nodes 506, 508, 510, as described above. In an exemplary embodiment, because the number of rules for each child node 508, 510 is equal to the leaf threshold, the search tree generation process 300 designates each child node 508, 510 as a leaf node by updating the index to indicate the nodes 508, 510 are leaf nodes and exits. It will be appreciated in the art that by dividing a parent node using the node bounds rather than dividing the parent node using the field bounds, the parent node is split among a smaller range of values which results in less duplication of rules across child nodes, and thereby improves the efficiency of the search tree in terms of both storage requirements and efficiency and/or speed of rule lookup, as described in greater detail below.

Figure 6:
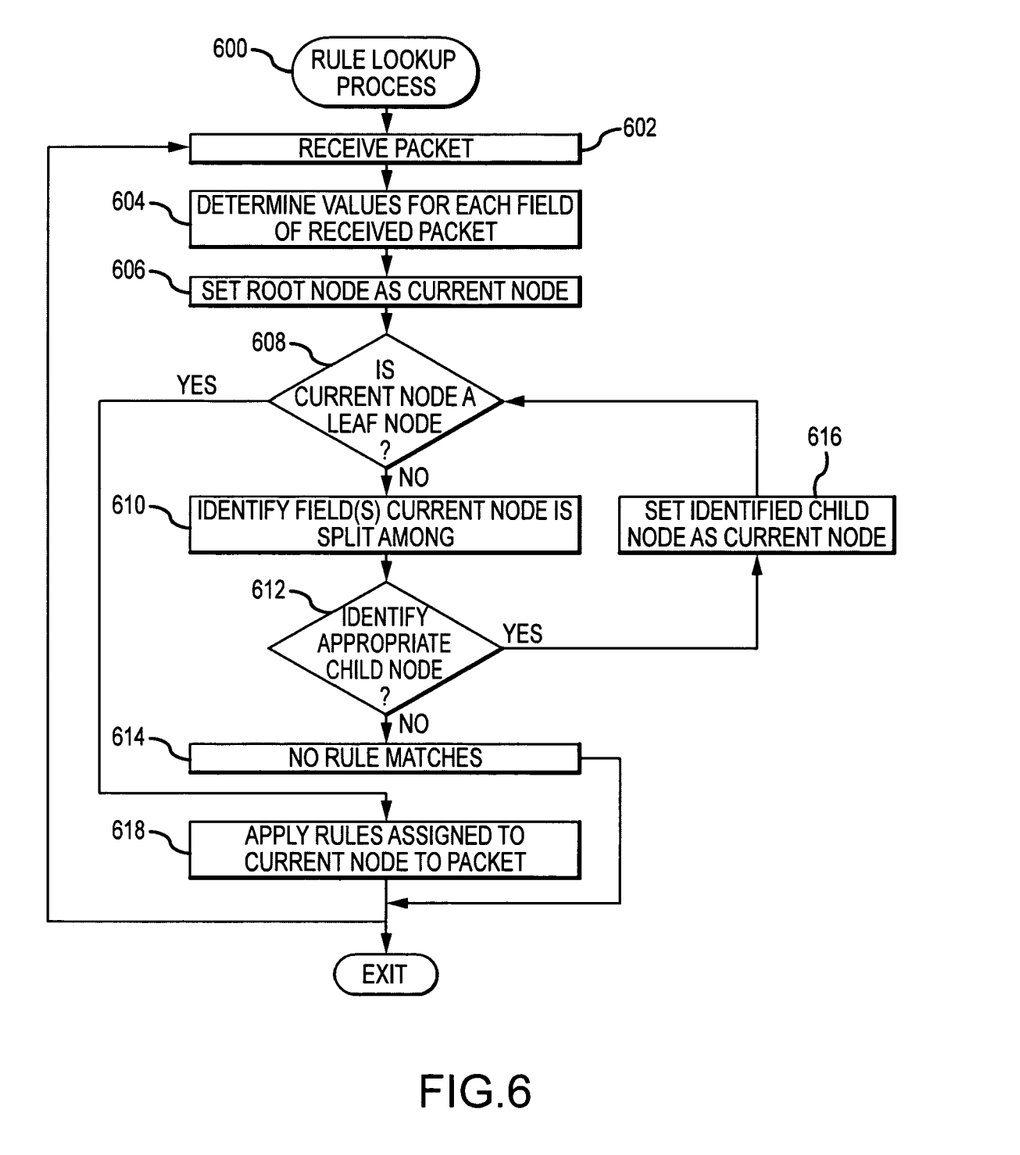
FIG. 6 is a flow diagram of a rule lookup process in accordance with one embodiment.

Referring now to FIG. 6, in an exemplary embodiment, a computer network may be configured to perform a rule lookup process 600 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the network infrastructure component 104, 200, computing devices 102, the processing architecture 204, the switching logic 206, and/or the memory 208. It should be appreciated any number of additional or alternative tasks may be included, and may be incorporated into a more comprehensive procedure or process having additional functionality not described in detail herein.

Referring now to FIG. 6, and with continued reference to FIGS. 1-5, the rule lookup process 600 may initialize after a network infrastructure component or another computing device performs a search tree generation process 300 and begins operation (e.g., transmitting and/or receiving data). In an exemplary embodiment, the rule lookup process 600 begins by receiving a packet or another encapsulated and/or formatted data unit and determining the values for one or more fields of the packet (tasks 602, 604). For example, a network infrastructure component 104, 200 may receive a packet (e.g., via communication module 202) from another computing device 102 within the computer network 100, and identify the values for fields of the packet (e.g., source address, destination address, source port, destination port, protocol, and the like).

In an exemplary embodiment, the rule lookup process 600 continues by selecting the root node of the search tree as the current node for evaluation (task 606). For example, the processing architecture 204 may access and/or read the index stored in memory 208 to identify the range of memory addresses that correspond to the root node of the search tree, and obtain the stored information regarding the root node (e.g., the assigned field bounds and rules) from the identified range of memory addresses. If the current node is designated or otherwise identified as a leaf node, the rule lookup process 600 continues by applying the set of rules assigned to the current node to the received packet, as described in greater detail below (tasks 608, 618).

If the current node is not a leaf node, the rule lookup process 600 continues by identifying the field(s) along which the current node has been split and/or divided (tasks 608, 610). For example, for the search tree 500 of FIG. 5, if the root node 502 is the current node, the rule lookup process 600 may identify Field 1 (e.g., based on the information obtained from memory 208) as the field along which the root node 502 is split. Based upon the identified field(s), the rule lookup process 600 continues by identifying the appropriate child node of the current node based on values of the received packet for the identified field(s) (task 612). For example, the rule lookup process 600 may compare the value of Field 1 in the received packet to the values for Field 1 from the child field bounds for the child nodes 504, 506.

If the value of the identified field(s) for the received packet is within the child field bounds one of the child nodes, the rule lookup process 600 may identify that child node and establish the identified child node as the current node (tasks 612, 616). The loop defined by tasks 608, 610, 612, and 616 repeats until the rule lookup process 600 identifies that the current node is a leaf node or otherwise fails to identify an appropriate child node as described below (tasks 612, 614). In this regard, the rule lookup process 600 traverses the search tree in a conventional manner. For example, referring again to FIG. 5, if the value of Field 1 of a received packet were 780, the rule lookup process 600 would identify node 506 as the appropriate child node of the root node 502, and subsequently identify node 508 as the appropriate child node of node 506. Once the rule lookup process 600 sets node 508 as the current node, the rule lookup process 600 identifies node 508 as a leaf node and proceeds to apply the set of rules assigned to node 508 to the received packet, as described in greater detail below (tasks 608, 618).

In accordance with one embodiment, the rule lookup process 600 may fail to identify an appropriate child node if the value of the identified field(s) for the received packet is not within the child field bounds of any of the child nodes (task 612). The rule lookup process 600 may continue by determining that there is no rule in the ruleset that matches the received packet (task 614). For example, if Field 1 of a received packet has a value of 580, the rule lookup process may identify node 506 as the appropriate child node of the root node 502 but fail to identify an appropriate child node of node 506. In accordance with one embodiment, the rule lookup process 600 applies a default rule or default condition to the received packet if it fails to identify an appropriate child node. For example, in a default allow implementation, the rule lookup process 600 may automatically allow the received packet by transmitting and/or routing the received packet to the appropriate destination. Conversely, in a default deny implementation, the rule lookup process 600 may automatically drop or deny the received packet by failing to transmit and/or route the received packet to the appropriate destination.

In an exemplary embodiment, once the rule lookup process 600 identifies the current node as a leaf node, the rule lookup process 600 applies the set of rules assigned to the current node by comparing the value for the fields of the received packet to the values for the fields of the individual rules assigned to the current node (tasks 608, 618). In accordance with one embodiment, the rule lookup process 600 applies the set of rules assigned to the current node in the order of the rules priority (task 618). In this regard, the set of rules (or ruleset) is created such that each rule has a unique priority associated with it in order to resolve the situation where more than one rule would potentially apply to a given packet, as will be appreciated in the art. For example, if a received packet has field values of (780, 305, 34, 1000, 2000), the rule lookup process 600 would identify node 508 as the appropriate leaf node and apply the rules of node 508 to the received packet until a match is found. In this situation, the values of the fields for the received packet are within the values of the fields defined by both rule R5 and rule R6. If rule R5 has a higher priority than rule R6, then the rule lookup process 600 would compare rule R5 to the received packet prior to comparing rule R6 to the received packet, such that rule R5 would be identified as matching and the packet would be handled based upon rule R5. Conversely, if rule R6 has a higher priority than rule R5, then the rule lookup process 600 would compare rule R6 to the received packet prior to comparing rule R5 to the received packet, such that rule R6 would be identified as matching and the packet would be handled based upon rule R6. If no rule of the rules assigned to the current node matches the field values of the received packet, the rule lookup process 600 may apply a default rule or default condition to the received packet in a similar manner as described above (e.g., task 614). Depending on the embodiment, after applying the rules assigned to the current node to the received packet, loop defined by tasks 602, 604, 606, 608, 610, 612, 614, 616, and 618 may repeat as desired throughout operation of the computer network, or alternatively, the rule lookup process 600 may terminate or exit.

It will be appreciated in the art that by dividing a parent node along the node bounds rather than the field bounds, the parent node is split among a smaller range of values which results in less duplication of rules across child nodes, and thereby improves the efficiency of the search tree in terms of both storage requirements and efficiency and/or speed of rule lookup. For example, referring to FIGS. 4 and 5, if node 506 were split along Field 1 using the field bounds (551-1000), the child field bounds for the first child node would be (551-775, 300-310, 30-38, 1000-1001, 2000-2001) and the child field bounds for the second child node would be (776-1000, 300-310, 30-38, 1000-1001, 2000-2001). As a result, second child node would be assigned rules R5 through R9, or five rules, based on the span of Field 1 for its child field bounds. Because the number of rules assigned to second child node would exceed the leaf threshold (three), second child node would be split into additional child nodes, resulting in a search tree having greater height and/or depth and having increased storage requirements. In addition, if a received packet has a value of 780 for Field 1, an additional level of the search tree would have to be traversed in order to identify the appropriate leaf node. Accordingly, the search tree generation process 300 described above results in a more efficient tree with reduced storage requirements and faster rule lookup relative to conventional search trees.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A method for implementing a firewall in a network infrastructure component having a memory, the firewall comprising a plurality of rules, the method comprising:
    generating a search tree for the plurality of rules, the search tree being stored in the memory, wherein generating the search tree comprises:
        assigning first field bounds and a first set of rules of the plurality of rules to a first node stored in a first region of a range of memory addresses;
        dividing the first node into a plurality of child nodes based on an intersection of the first set of rules and the first field bounds, each child node of the plurality being stored in a respective region of the range of memory addresses;
        assigning child field bounds to each respective child node, wherein each respective child field bounds is a subset of the intersection of the first set of rules and the first field bounds; and
        assigning a respective subset of the first set of rules to each respective child node based on the respective child field bounds, wherein each respective subset intersects the respective child field bounds for the respective child node;
    receiving a first packet by the network infrastructure component;
    identifying a first child node of the plurality of child nodes based on values for one or more fields of the first packet; and
    applying the respective subset of rules assigned to the first child node to the first packet.

2. The method of claim 1, wherein generating the search tree comprises determining the intersection of the first set of rules and the first field bounds.

3. The method of claim 2, wherein generating the search tree further comprises:
    applying a heuristic to obtain a division criterion, wherein the division criterion is based at least in part on the intersection of the first set of rules and the first field bounds; and
    splitting the first node into the plurality of child nodes based on the division criterion.

4. The method of claim 3, wherein splitting the first node into the plurality of child nodes comprises, for each respective child node, assigning child field bounds to the respective child node based on the division criterion.

5. The method of claim 1, further comprising:
assigning a second child field bounds to a second child node based on the intersection of the first field bounds and the first set of rules;
assigning a second subset of rules to the second child node based on the second child field bounds;
determining a number of rules of the second subset of rules is greater than a leaf threshold, wherein generating the search tree further comprises:
determining an intersection of the second set of rules and the second child field bounds;
applying the heuristic to obtain a division criterion for the second child node, wherein the division criterion is based at least in part on the intersection of the second set of rules and the second child field bounds; and
splitting the second child node into a plurality of grandchild nodes based on the division criterion, each grandchild node being stored in a respective region of the range of memory addresses.

6. The method of claim 5, wherein splitting the second child node into the plurality of grandchild nodes comprises, for each respective grandchild node:
assigning grandchild field bounds to the respective grandchild node based on the division criterion, wherein the grandchild field bounds comprises a subset of the second child field bounds; and
assigning a set of rules comprising a subset of the second subset of rules to the respective grandchild node based on the grandchild field bounds.

7. A network infrastructure component comprising:
a memory having stored thereon a search tree comprising:
a first node stored in a first region of a range of memory addresses, the first node being assigned a first field bounds and a first set of rules; and
a plurality of child nodes for the first node, each child node of the plurality being stored in a respective region of the range of memory addresses, wherein each child node is assigned child field bounds comprising a subset of an intersection of the first field bounds and the first set of rules, and each child node is assigned a subset of the first set of rules, the subset of rules assigned to each child node intersecting its assigned child field bounds;
a communication module configured to receive a packet; and
a processing architecture coupled to the memory and the communication module, wherein the processing architecture is configured to:
identify a first child node based on values for one or more fields of the packet; and
apply the subset of the first set of rules assigned to the first child node to the packet.

8. The network infrastructure component of claim 7, wherein the processing architecture is configured to identify the first child node by comparing values for one or more field of the packet to the assigned child field bounds of each child node.

9. The network infrastructure component of claim 7, wherein the processing architecture and the communication module are cooperatively configured to forward the packet to a destination address if one or more fields of the packet match a rule of the first set of rules.

10. The network infrastructure component of claim 7, wherein the processing architecture and the communication module are cooperatively configured to drop the packet if one or more fields of the packet match a rule of the first set of rules.

11. The network infrastructure component of claim 7, wherein the processing architecture is configured to generate the search tree.

12. The network infrastructure component of claim 11, wherein the processing architecture is configured to generate the search tree by:
assigning the first field bounds to the first node;
assigning the first set of rules to the first node based on the first field bounds;
determining the intersection of the first set of rules and the first field bounds;
obtaining a division criterion for the first node, wherein the division criterion is based at least in part on the intersection of the first set of rules and the first field bounds; and
splitting the first node into the plurality of child nodes based on the division criterion.

13. The network infrastructure component of claim 7, further comprising an input device coupled to the processing architecture, the input device being adapted to allow a user to enter a plurality of rules, wherein the processing architecture is configured to generate the search tree by:
assigning the first set of rules to the first node based on the first field bounds, the first set of rules comprising a subset of the plurality of rules;
determining node bounds as an intersection of the first field bounds and the first set of rules; and
dividing the first node into the plurality of child nodes based on the node bounds.

14. A method for creating a search tree for an access control list including a plurality of rules, the method comprising:
assigning a first field bounds to a first node, the first node being stored in a first region of a range of memory addresses in a memory;
assigning a first set of rules of the plurality of rules to the first node based on the first field bounds;
determining node bounds as an intersection of the first field bounds and the first set of rules;
dividing the first node into a plurality of child nodes based on the node bounds, each child node being stored in a respective region of the range of memory addresses and each child node being assigned child field bounds comprising a subset of the node bounds; and
updating an index stored in an index region of the range of memory addresses, the index storing relationship information for the first node and the plurality of child nodes.

15. The method of claim 14, wherein dividing the first node into a plurality of child nodes comprises:
applying a heuristic using the node bounds to obtain a division criterion; and
splitting the first node into the plurality of child nodes based on the division criterion.

16. The method of claim 15, wherein splitting the first node into the plurality of child nodes comprises, for a first child node of the plurality of child nodes:
assigning first child field bounds to the first child node based on the division criterion, the first child field bounds comprising a first subset of the node bounds; and assigning a second set of rules to the first child node based on the first child field bounds, the second set of rules comprising a subset of the first set of rules that intersects the first child field bounds.

17. The method of claim 16, wherein if a number of rules in the second set of rules is greater than the threshold value, the method further comprises:
   determining child node bounds as an intersection of the first child field bounds and the second set of rules;
   dividing the first child node into a plurality of grandchild nodes based on the child node bounds, each grandchild node being stored in a respective region of the range of memory addresses; and
   updating the index, wherein the index stores relationship information for the first child node and the plurality of grandchild nodes.

18. The method of claim 17, wherein dividing the first child node into a plurality of grandchild nodes comprises:
   applying the heuristic using the first child node bounds to obtain a second division criterion; and
   splitting the first child node into the plurality of grandchild nodes based on the second division criterion.

* * * * *